United States Patent [19]

Hicks, Jr.

[11] 4,456,126
[45] Jun. 26, 1984

[54] SAFETY KIT

[76] Inventor: James D. Hicks, Jr., 476 S. King St., Gastonia, N.C. 28052

[21] Appl. No.: 463,679

[22] Filed: Feb. 4, 1983

[51] Int. Cl.³ .................. B65D 79/00; G09F 21/04; G09F 13/16; G09F 7/18
[52] U.S. Cl. ................... 206/573; 206/803; 40/591; 362/253; 362/382; 362/812
[58] Field of Search ............ 206/573, 803; 150/1; 116/28 R; 40/591; 246/488; 362/253, 382, 812

[56] References Cited

U.S. PATENT DOCUMENTS 3,425,539 2/1969 Mach .................................. 150/1
4,108,311 8/1978 McClendon ..................... 206/573
4,192,090 3/1980 Seth ..................................... 40/591
4,208,820 6/1980 Cole .................................... 40/591

FOREIGN PATENT DOCUMENTS 2212339 9/1973 Fed. Rep. of Germany ........ 40/591

Primary Examiner—William T. Dixson, Jr.
Attorney, Agent, or Firm—Clifton Ted Hunt

[57] ABSTRACT

A safety kit comprising a housing or box structured to compactly contain warning devices to give notice of a vehicle in distress and to display certain of the warning devices in an emergency situation. The box includes means to prominently and firmly support certain of the warning devices on a disabled automobile.

3 Claims, 8 Drawing Figures

SAFETY KIT

BACKGROUND OF THE INVENTION

Motorists with automobile trouble, such as mechanical failure or running out of fuel have an additional problem in warning approaching motorists of the disabled vehicle which may create a safety hazard to approaching motorists.

Heretofore, it has been accepted practice to tie a white piece of cloth on the door handle of a disabled vehicle to warn approaching motorists that the vehicle is disabled. This practice is deficient in that it does not give any advance warning to approaching motorists and because sometimes the size of the cloth attached to the car is so small that it is frequently not seen in time to serve as an adequate warning.

The use of blinker lights to warn approaching motorist of a disabled car is an improvement over the warning provided by the cloth attached to the car, but the use of blinker lights does not provide advance warning if the car is disabled and stalled just past the top of a hill or just past a curve in the road.

The practice of raising the hood of a disabled vehicle to indicate that the automobile is disabled or nonoperative is another conventional way of giving notice to approaching motorists that the vehicle is disabled. This method of signaling distress is also ineffective of giving adequate notice of distress until the approaching motorist is almost on the scene, as when the disabled vehicle is near a sharp curve or just below the crest of a hill. The raising of the hood is especially unsatisfactory when it is raining because it exposes the engine to the rain.

The use of flares spaced a reasonable distance beyond a disabled vehicle in the path of approaching traffic is recognized in the prior art as an effective advance warning and flares are included as one of several types of warning elements in the safety kit of the present invention.

SUMMARY OF THE INVENTION

The safety kit of the present invention includes a box or housing contining a supply of flammable flares, signs preprinted with appropriate emergency messages, a blank sign and a marking crayon so a stranded motorist can word an appropriate message, and a warning light. The box or housing is structured to compactly store the several warning elements in a vehicle during normal travel.

The box of the safety kit has a locking rib projecting therefrom to be received in the space between the trunk lid and body or in the space between the engine hood and body to frictionally attach the box to the disabled vehicle for the purpose of visibly and reliably supporting a lighted sign with an appropriate message.

It is an object of this invention to provide a safety kit comprising a plurality of different types of warning devices and a container specifically structured to house the warning devices for convenient storage in an automobile during normal conditions and to display certain of the warning devices in an emergency.

It is a more specific object of the invention to provide a housing of the type described and comprising a body portion shaped to contain the warning elements, a top normally closing the body portion, and means for releasably locking the top in a predetermined angular relation to the body portion to display a lighted sign.

It is a still more specific object of the invention to provide a housing of the type described wherein the top of the housing includes support elements on its exterior surface shaped and dimensioned to display a selected sign and a warning light.

It is a still further object of the invention to provide a housing of the type described which includes a rib on the exterior surface of the body portion and registrable with the space between a hinged trunk lid or hood and the proximate body portion of that vehicle.

DETAILED DESCRIPTION OF THE INVENTION

Figure 1:
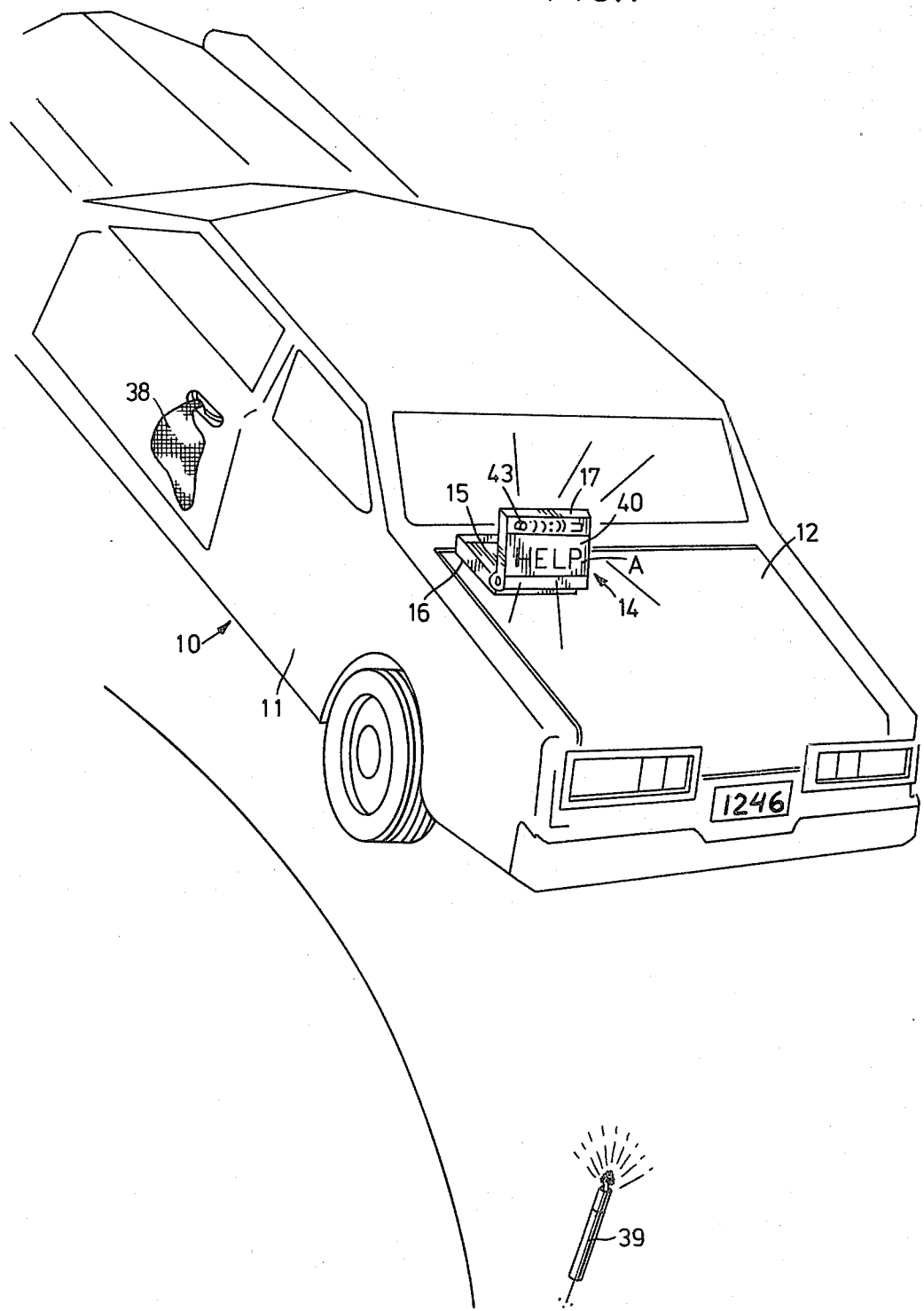
FIG. 1 is a perspective view of a disabled vehicle illustrating the mounting of the safety kit on the vehicle in operative position and a warning flare removed from the kit and positioned to serve as advance warning of a disabled vehicle.

Referring more specifically to the drawings, the numeral 10 broadly indicates a disabled vehicle having a body 11, a trunk lid 12 and an engine hood 13. A safety kit broadly indicated at 14 is illustrated in an operative position on the trunk lid 12 of the disabled automobile 10.

Figure 3:
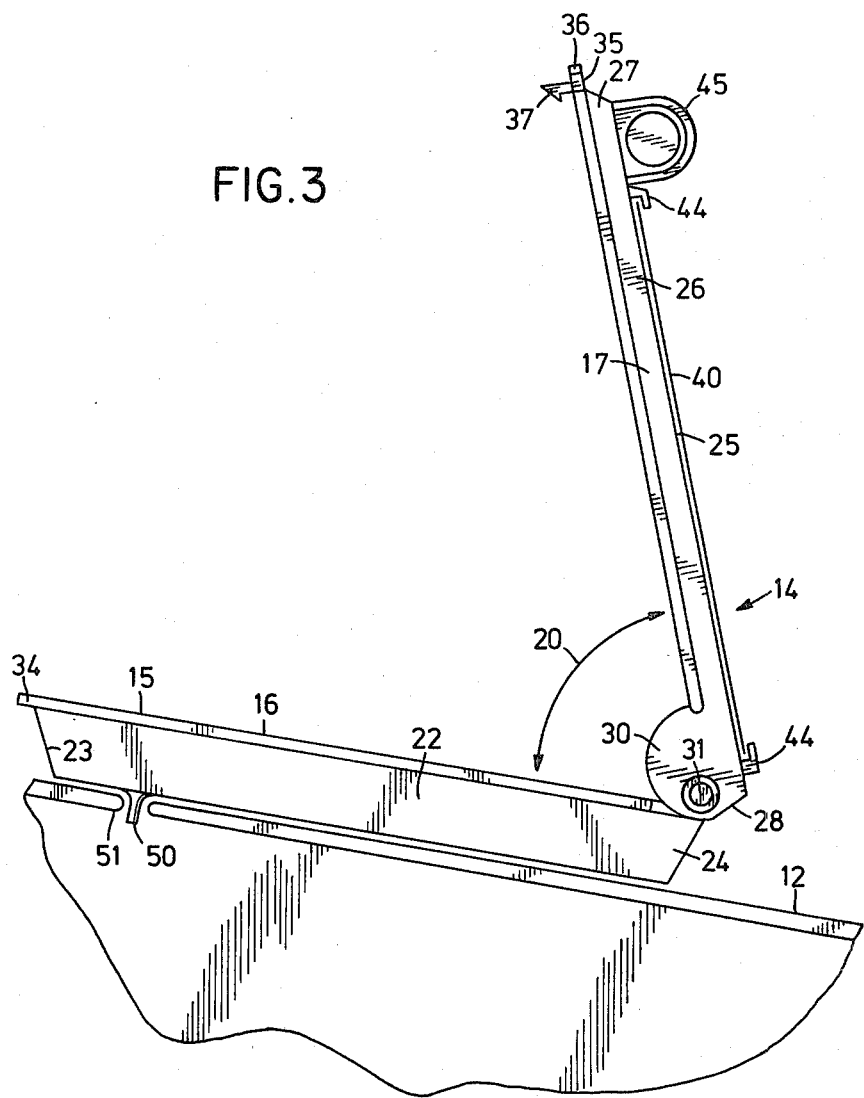
FIG. 3 is an enlarged fragmentary side elevation of the vehicle and safety kit shown in FIG. 1 illustrating the frictional retention of the opened safety kit on the trunk of the vehicle.

The safety kit 14 comprises a housing 15 including an open-top body portion 16 and an articulated top portion 17 movable between a closed position engaging and closing the body portion 16 (FIG. 4) for storage when not in use and an extended operative position at a predetermined fixed angle 20 (FIG. 3). The body 16 includes a bottom wall 21, end walls 22, a front wall 23 and a rear wall 24. The top 17 includes a top wall 25, end walls 26, a front wall 27 and a rear wall 28.

Figure 5:
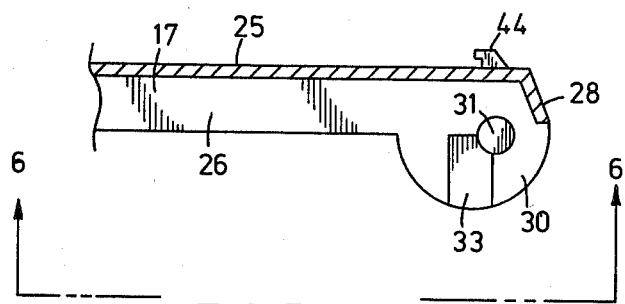
FIG. 5 is a fragmentary side view of the hinged portion at the rear of the top for the safety kit.
Figure 6:
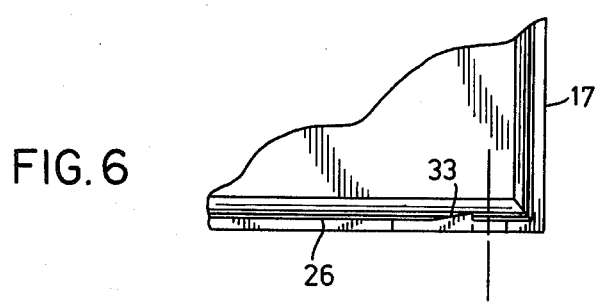
FIG. 6 is a fragmentary inverse plan view showing the same hinged portion of the top as shown in FIG. 5.
Figure 7:
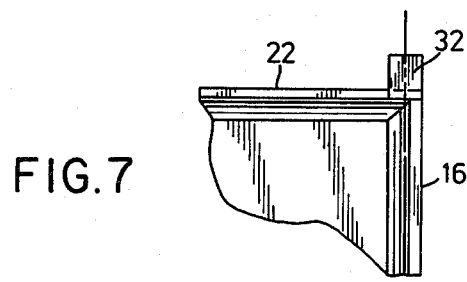
FIG. 7 is a fragmentary plan view showing the hinged portion of the body of the safety kit.
Figure 8:
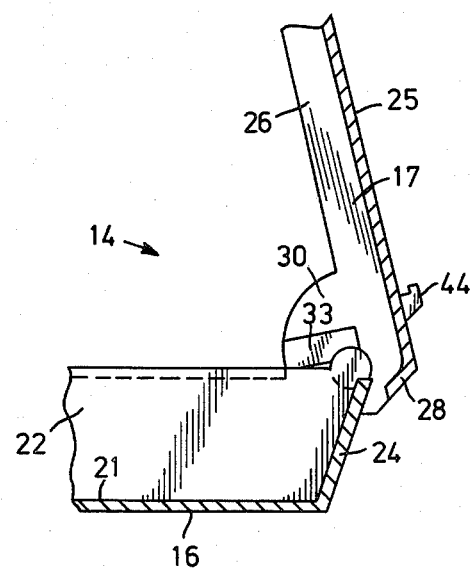
FIG. 8 is a fragmentary side elevation showing the hinged portions of the assembled body and top of the safety ket with the top locked in raised position as to display a sign.

Each of the end walls 26 of the top 17 terminates adjacent its rear wall 28 in an arcuately extending flange 30 formed integral with the ends of the rear wall 28. Each of the flanges 30 has a circular opening or bore 31 extending transversely therethrough for the reception of a pivot pin 32 projecting inwardly from each end wall 22 of the bottom portion 16. As most clearly seen in FIGS. 5 and 6 a detent 33 projects inwardly from the side wall 26 of top portion 17 adjacent the circular opening 31. The detent 33 bears against the pin 32 when the top 17 is raised to the pre-determined angle 20 to releasably lock the top 17 in its fully extended operative position of FIGS. 2 and 8.

Figure 2:
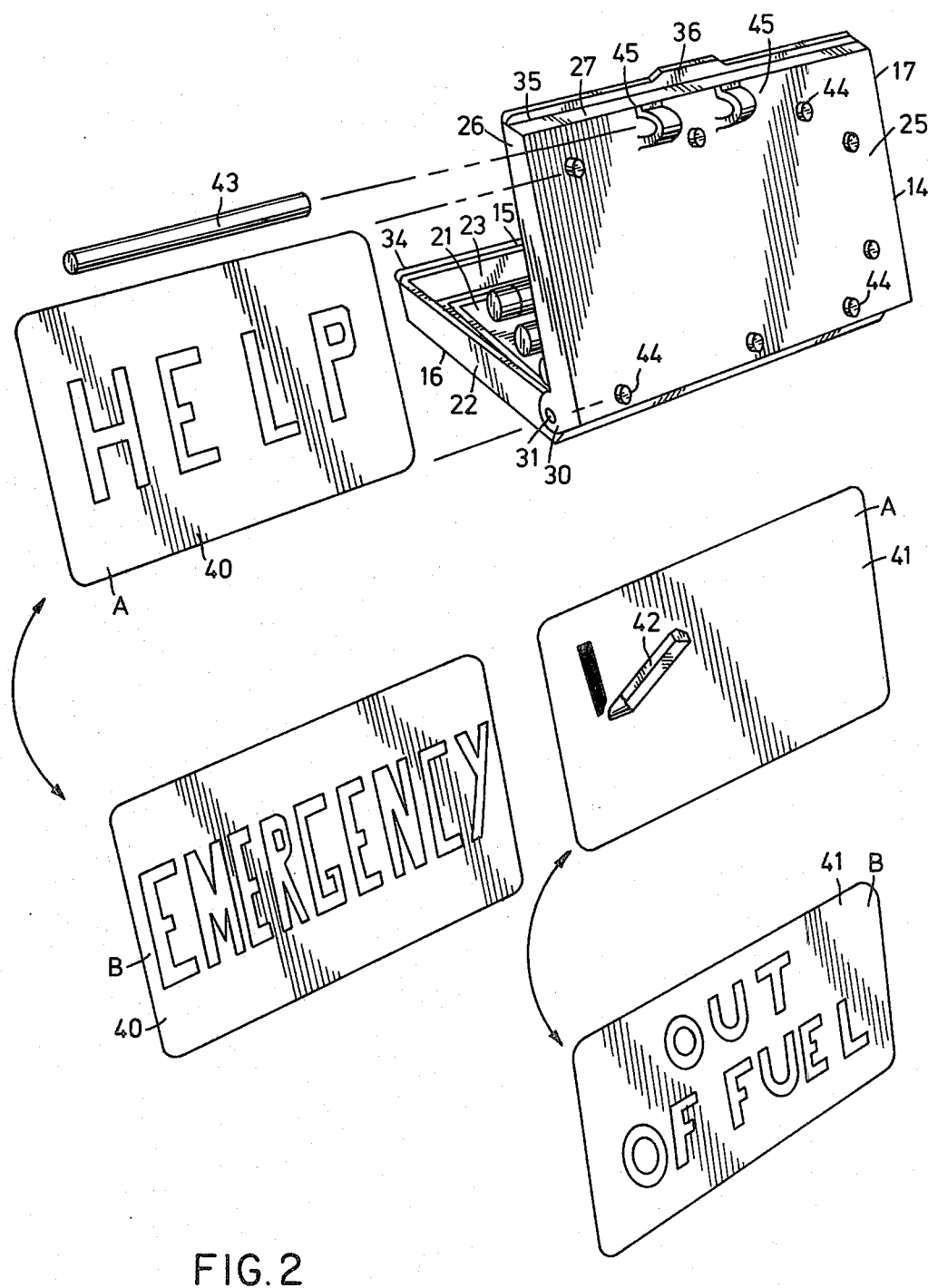
FIG. 2 is an enlarged perspective view of the safety kit as shown in FIG. 1 but removed from the vehicle and illustrating support elements on the exterior of the top for displaying a warning sign and a warning light normally carried in the safety kit.
Figure 4:
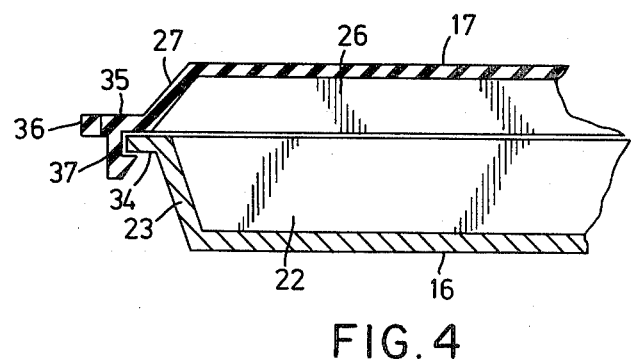
FIG. 4 is a fragmentary transverse sectional view through the center of the safety kit showing the latch structure on the front walls in closed position.

A lip 34 projects forwardly from the front wall 23 of body portion 16 and a lip 35 projects forwardly from the front wall 27 of top portion 17 (FIGS. 2 and 4). The lips 34 and 35 extend between respective end walls 22 of the body portion 16 and end walls 26 of the top portion 17, and a tab 36 projects forwardly from the medial portion of top lip 35 as most clearly seen in FIG. 2. Referring to FIGS. 3 and 4, a hook 37 depends from lip 35 behind tab 36 and extends under lower lip 34 to lock the top 17 in closed position over the body 16 for storage of the components of the kit during normal operation of the vehicle.

The housing 15 is preferably of rectangular configuration and may be of any desired size, cross-sectional dimensions of 8 by 15 inches having been found to satisfactorally house different types of warning devices, namely, a safety flag 38 of a suitable size, such as 8×15 inches, to readily attract attention, flares 39, signs 40 and 41, a crayon marker 42, and a tube light 43.

The flares 40 are preferably of the type that have anti-roll perforations at one end to keep them in place after they have been positioned at a desired location. Each flare will preferably burn for about twenty minutes after it is lighted, or a total of forty minutes for both flares normally provided in the kit.

The sign 41 is printed with a different message on each side, such as HELP on side A and EMERGENCY on side B. Sign 42 is blank on side A so a motorist may use the crayon marker 42 to put whatever message is desired on the blank space. Side B may be printed with the words OUT OF FUEL or any other message such as CAUTION. These messages are, of course, illustrative only and the signs may be pre-printed with any desired messages.

The exterior surface of the top 17 has formed integral therewith a plurality of L-shaped lugs 44 spaced apart and opening inwardly toward the mid-portion of the top 17 to receive and retain the edges of a selected sign 41 or 42 slid between the lugs 44 as illustrated in FIG. 2.

The exterior surface of top 17 also has a pair of circular lugs 45 between the front wall 27 and the proximal lugs 44 to receive and display the tube light 43.

The tube light 43 is preferably of the type marketed by American Cyanimide under its trademark CYALUME. The plastic tube of the light 43 is fragile and a continuous light is emitted for about twelve hours after the tube is cracked.

The warning devices supported by the top 17 of the safety kit may be prominently displayed on the disabled vehicle and frictionally retained in place by the positioning of a rib 50 extending outwardly from the bottom wall 21 of body portion 16 in a slot 51 conventionally defined at the juncture of the trunk lid 12 or hood 13 with the body 11 of the automobile.

In use, the housing 15 is opened and the top 17 raised to its extreme position where it is automatically locked by the detent 33 to provide an effective easel for prominently displaying a desired message selected from the signs 40 and 41 carried by the lugs 44 on the exterior of top 17. Tube light 43 is supported by the circular lugs 45 to illuminate the sign and to attract attention of passing motorists. The illuminated sign is preferably stabilized to prevent it being blown over by positioning the rib 50 in a slot 51 at the front or back of the car, as desired, One or more flares 39 may be positioned a reasonable distance from the car in the path of approaching motorists to give advance warning of the disabled vehicle.

Although the safety kit has been described and illustrated in use with an automobile, it is intended that the kit be used with any type of vehicle including, without limitation, trucks, motorcycles and airplanes. It is also intended that the safety kit be used to attract attention to any emergency situation including, without limitation, a disabled vehicle or an unexpected obstacle in the road, such as a tree limb, power line, or large rock.

There is thus provided an effective safety kit for giving warning to approaching motorists of a disabled vehicle or of a safety hazard in the road.

I claim:

1. A safety kit to be carried in a vehicle for use in warning approaching motorists when the vehicle is disabled, said safety kit comprising:
   a. a housing including a body and a top hingedly connected to the body and movable between a closed position covering the body and an open position extending angularly above the body;
   b. an anchor rib extending from the bottom of the body of the housing for locating the housing on the exterior of the vehicle in a position where the top is in its open position is visible to approaching motorists;
   c. a supply of signs normally carried in the housing;
   d. lug retaining means on the exterior surface of the top for displaying a selected sign to approaching motorists when the top is in its open position; and
   e. means within the housing for supporting the top in its open position.

2. A safety kit according to claim 1 wherein a self-energizing light is normally carried within the housing, and means for attaching the self-energizing light to the housing to illuminate a displayed sign.

3. A safety kit according to claim 1 wherein at least one safety flare is normally carried within the housing and available to be ignited and located at a distance from the vehicle when disabled to provide an initial warning to approaching motorists.

* * * * *